United States Patent [19]  [11] 4,069,171
Lemkey et al. [45] Jan. 17, 1978

[54] METALLIC FIBROUS SKELETAL CATALYSTS AND PROCESS FOR PRODUCING THEM

[75] Inventors: Franklin D. Lemkey, Glastonbury; Gerald S. Golden, Windsor, both of Conn.

[73] Assignee: United Technologies Corporation, Hartford, Conn.

[21] Appl. No.: 741,831

[22] Filed: Nov. 12, 1976

[51] Int. Cl.² .................. B01J 21/04; B01J 35/06
[52] U.S. Cl. ........................... 252/454; 252/461; 252/463; 252/467; 252/471; 252/472; 252/475; 252/476; 252/477 R
[58] Field of Search ............ 252/461, 477 Q, 477 R, 252/454, 463, 467, 471, 472, 475, 476; 428/608, 613, 614

[56] References Cited

U.S. PATENT DOCUMENTS

| | | | |
|---|---|---|---|
| 3,407,125 | 10/1968 | Fehlner | 204/2 |
| 3,720,856 | 3/1973 | Brody | 313/309 |
| 3,769,240 | 10/1973 | Lew et al. | 252/477 R |
| 3,900,626 | 8/1975 | Brennan | 252/477 R |

*Primary Examiner*—W. J. Shine
*Attorney, Agent, or Firm*—Charles E. Sohl

[57] ABSTRACT

High surface area skeletal metal catalysts and methods of producing such catalysts are described. The production involves solidification of certain eutectic compositions to produce a microstructure of intermetallic fibers in solid solution matrix. The matrix is preferentially removed to provide loose intermetallic fibers which may then be leached to provide a porous structure. Directional solidification is a preferred step in the production process.

9 Claims, 3 Drawing Figures

100,000 X

//METALLIC FIBROUS SKELETAL CATALYSTS AND PROCESS FOR PRODUCING THEM

CROSS REFERENCE TO RELATED APPLICATION

This application is similar in some aspects to U.S. Ser. No. 741,830, filed concurrently, which shares a common assignee.

BACKGROUND OF THE INVENTION

1. Field of the Invention

This invention relates to the subject of skeletal or porous metal catalysts. Methods of controlling the form and structure (i.e., surface area, particle size and shape, pore structure, surface and bulk composition) which control the ultimate performance of a skeletal type catalyst comprises the subject of the invention. This invention includes fabriccation techniques and the resultant skeletal catalysts.

2. Description of the Prior Art

The skeletal form of catalyst is described in numerous patents including U.S. Pat. Nos. 1,628,190; 2,384,501; 3,627,790 and 3,809,658. Briefly, this type catalyst is formed by the chemical leaching of an intermetallic compound formed between a catalytically active metal and a less noble metal. The leaching preferentially removes the less noble metal and produces a porous structure having a high surface area predominantly comprised of the catalytically active metal. The catalytically active metals include, but are not limited to, the transition metals. Intermetallic compounds between such a catalytically active element and a less noble (non-catalytic) element such as Al are usually employed.

Prior art fabrication techniques involve casting of intermetallic compositions followed by comminuting and leaching. Attempts to directly cast incongruently melting intermetallic compositions (such as those involving peritectic reactions) are usually not successful, resulting in a mix of phases rather than a single phase intermetallic structure.

In a different subject area, but one which relates to this invention, it is known that under certain solidification conditions an oriented microstructure may be produced in eutectic compositions. This is taught in U.S. Pat. Nos. 3,124,452; 3,528,808; 3,552,953; 3,554,817; 3,564,940 and 3,671,223 all of which are assigned to the assignee of the present invention.

SUMMARY OF THE INVENTION

Catalytically active articles and methods for making these articles are described. The catalytic articles are porous single crystal catalytic fibers or ribbons. The catalytic fibers of the invention are prepared by the solidification of eutectic compositions which produces an article with a fibrous microstructure. The eutectic is chosen so that the matrix is a solid solution of a less noble metal (Al, by way of example) and the fibrous second phase is a single crystal of an intermetallic compound between the less noble matrix element and a second more noble element which has catalytic properties. The second element is typically a transition metal. The directionally solidified article is then chemically treated so as to completely remove the matrix leaving a plurality of fibrous intermetallic particles. A chemical leaching treatment may then be used to remove the matrix element from the single crystal fibers, producing porous catalytically active fibers. The leaching step may often be performed concurrently with the matrix removal step. The fibers may be used in loose fiber form, pulverized, or may be compacted into a fibrous mat.

The foregoing and other objects, features and advantages of the present invention will become more apparent in the light of the following detailed description of preferred embodiments thereof as discussed and illustrated in the accompanying drawings.

DESCRIPTION OF THE PREFERRED EMBODIMENTS

Figure 1:
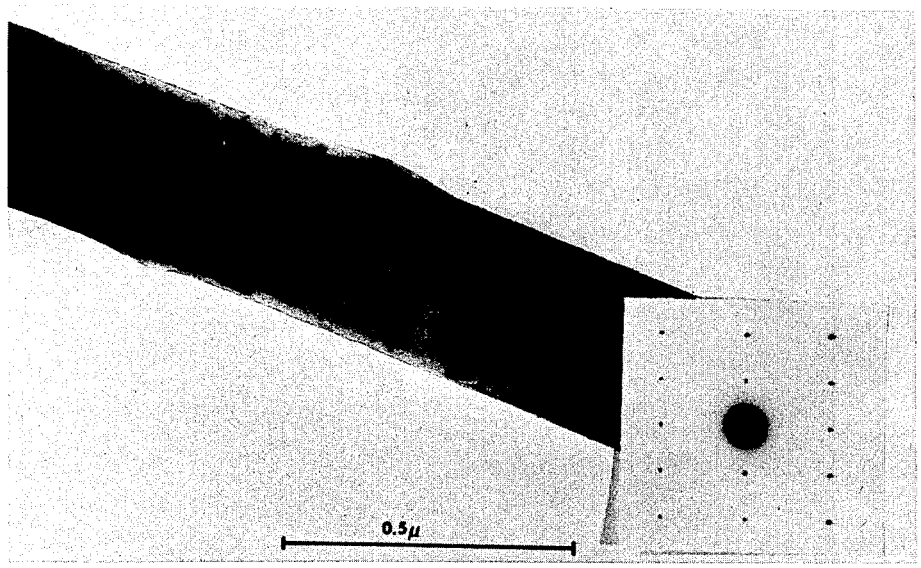
FIG. 1 shows a transmission electron micrograph of $Al_3Ni$ fibers which have been removed from an aluminum matrix.

The prior art skeletal type catalysts are produced by the chemical leaching of an intermetallic compound to produce a highly porous, catalytically active article. The intermetallic is produced in bulk form by casting and is usually ground to particles or powder either before or after the leaching and must then be supported when used as a gas phase catalyst.

The present invention produces a catalyst in a similar fashion, (by leaching of an intermetallic compound), but the method of obtaining the intermetallic precursor and resulting catalyst are different. The catalyst of the present invention is a plurality of catalytically active fibers. The fiber diameter is on the order of microns in dimension and the ratio of length to diameter is great.

The teachings of U.S. Pat. No. 3,124,452, which relates to the directional solidification of eutectic compositions, is incorporated herein by reference. Briefly, this patent discloses that slow progressive solidification of a molten eutectic composition wherein the solid-liquid interface may be constrained to be relatively flat and to move along a particular axis can produce an oriented fibrous microstructure wherein the fibrous second phase is oriented parallel to the direction of motion of the solid-liquid interface with controllable whisker sizes and spacings. Fiber diameters are typically from about 0.01 to about 10 microns and fiber lengths may range from about 10 microns continuous over the entire length of the solidified article. The term fibrous will be used in this application to denote fiber-like morphologies, rod-like morphologies, platelike morphologies, and mixtures of these morphologies, and the term fiber will be used to denote rods and plates as well as fibers. Although binary eutectics are usually employed, higher order eutectic compositions, such as ternary eutectics, may also be directionally solidified. The process of this invention has particular utility with respect to eutectic reactions in which the intermetallic constituent forms by a peritectic reaction. The presence of such a peritectic reaction makes the direct casting of such an intermetallic impossible. The Al-Ni system in which the compound $Al_3Ni$ forms by a peritectic reaction exemplifies this situation. It is impossible to directly cast $Al_3Ni$ without the formation of large amounts of $Al_3Ni_2$. This is detrimental since the $Al_3Ni$ compound appear to have more catalytic activity than does the $Al_3Ni_2$ compound. The eutectic solidification reaction assures that all fibers (which solidify concurrently with the adjacent matrix) are of a constant intermetallic composition.

The precursors of the fibrous catalysts of the invention are single crystal intermetallic fibers. These precursor fibers have unique properties including: homogenous composition, constant controllable geometry, adequate mechanical properties, and the ability to "felt" or interlock to form a mat after leaching. The single crystal nature of the precursor fiber is a result of the directional solidification process and this single crystal property results in high mechanical properties. The single crystal precursor fiber is transmuted into a porous single crystal fiber after leaching. The fibers have a large length to diameter ratio, and, after removal of the matrix the fibers will mat or interlock to form an assembly which is reasonably cohesive.

Directional solidification is the preferred method of manufacture of the precursor since the intermetallic fibers so produced are extremely uniform in diameter and are aligned within the matrix. The uniformity of the fibers permits more accurate control and prediction of catalytic activity. However, for less demanding applications, normal solidification processes which produce nonaligned fibers of varying orientations may be employed.

For some applications in which extremely fine catalytic particles are desired, the molten eutectic material may be made into powder by any of the well known, high rate cooling processes. These include gas atomization and centrifugal atomization. Further control over final fiber diameter may be provided by sieving the powder to separate the various size fractions, since eutectic fiber size is controlled by cooling rate and the finer size particles cool at a faster rate than the coarser particles.

This invention utilizes a class of eutectics having a structure in which the matrix is a solid solution of one element, which is not usually an active catalyst, and the fibrous oriented second phase is an intermetallic compound containing the matrix element and at least one second element. The second element is one which is catalytically active when prepared in a high surface area form. The major element in the solid solution matrix is preferably less noble than the catalytically active element in the second phase. This less noble matrix element is thus more active chemically and may be preferentially removed to expose the intermetallic fibrous second phase.

Preferential removal of the matrix to expose the fibers is an integral part of the process of the invention. Chemical removal is preferred, and either acidic or basic solutions may be utilized depending upon the matrix material. With aluminum matrices, caustic (basic) leaching solutions are preferred, for example, aqueous solutions containing up to about 25% NaOH may be employed. The chemical removal process may be accelerated by the application of heat, pressure, forced convection, electric current or combinations thereof. High vapor pressure matrices (such as zinc) might also be removed by thermal evaporization in a vacuum. More generally, any method which preferentially removes the matrix may be employed.

The specific details of the matrix preferential removal step are well known in the art and are not a part of this invention. Virtually any process which will remove the matrix without excessively attacking the fibrous second phase may be employed.

The removed fibers, which are of intermetallic composition, may then be treated to selectively remove the noncatalytic element, to leave a porous catalytic structure behind. In general, however, the matrix removal step will also remove at least a portion of the matrix element from the intermetallic fibers. The selective removal is performed, generally in accordance with the procedure which would be followed to prepare a prior art skeletal catalyst from the same intermetallic material. It is characteristic of solidified eutectics that each individual fiber is a single crystal. This single crystal feature is effectively retained even after the selective matrix element removal step, and this single crystal type of structure provides good mechanical properties, even after leaching.

The specific details of the selective leaching operation do not form part of this invention. Once the preferential chemical removal of the matrix exposed has the fibers, any leaching treatment which has been used in the prior art to convert the same intermetallic, in bulk form, to a catalyst may be used to convert the fibers to a catalytic form. Such leaching procedures are described in Journal of Catalysis, Vol. 14, pp. 247–256 (1969), Vol. 16, pp. 281–291 (1970), and Vol. 41, pp. 405–411 (1976) by J. B. Anderson et al, the contents of which are incorporated herein by reference. Because the element to be removed from the intermetallic is identical to the major matrix element, it is quite probable that the chemical treatment employed to preferentially attack the matrix may also tend to selectively lach the intermetallic fibers. In most situations, it will be possible to combine these two steps. In aluminum matrix systems, mineral acids may be used to remove the matrix without significantly affecting the intermetallic. The use of a mineral acid for matrix removal followed by a caustic leaching step permits more control over the leaching process, and resultant catalytic properties.

While virtually any eutectic which can be solidified to form a less noble metallic solid solution and a more noble fibrous intermetallic phase may be employed, providing of course that the fiber product which remains after leaching is catalytic, certain eutectic compositions are preferred. Matrices based upon aluminum, copper, magnesium, zinc and silicon are preferred. Because of its ease of chemical removal, and prior use in the production of bulk skeletal type catalysts, aluminum is the most preferred matrix element.

The catalytic element, that element which combines with the predominant matrix element to form the second phase intermetallic, is preferably selected from the group consisting of IB type metals, IVB metals, VB metals, VIB metals, VIIB metals, and VIII metals, wherein the Roman numeral metals designations refers to the conventional (long form) periodic table. Elements which have proven catalytic activity in skeletal form include nickel, platinum, osmium, palladium, ruthenium, rhenium, rhodium, gold, iridium, cobalt, iron, molybdenum, copper, silver, and alloys based on these elements. Preferred catalytic elements include ruthenium, rhodium, cobalt, nickel, platinum, iron, molybdenum, and alloys thereof.

The preceding discussion of matrix elements and intermetallic compound elements is complete, however, not all combinations of these elements form eutectics or form eutectics which are amenable to solidification to form aligned continuous fibrous microstructures. The question of whether a eutectic forms between two particular elements may be resolved by reference to any of the readily available compilations of phase diagrams. The applicability of directional solidification to a particular eutectic alloy system, to produce the desired aligned fibrous microstructure, may easily be experimentally determined by one skilled in the art.

This invention also contemplates the production of alloy type skeletal catalysts. It is known that in all eutectics there are significant differences (chemical, electrical, physical) between the atomic species which comprise the matrix and the second atomic species which forms the intermetallic compound. If another atomic species is added prior to solidification it may preferentially segregate (partition) to one of the phases. The greater the property difference between the phases and the more similar the added elements is to one of the phase constituents, the greater will be the degree of partitioning. This behavior may be used to advantage in the production of true alloy skeletal type catalysts. Consider, for example, the aluminum-nickel system, the classic system used to produce skeletal nickel. After directional solidifcation according to this invention, the structure consists of oriented $NiAl_3$ single crystal intermetallic fibers in an Al-Ni solid solution (the percent nickel in solid solution will usually be less than about 0.05 weight percent). The solid solubility of platinum in nickel is extensive, it is entirely miscible in the liquid and solid state while, at the same time, the solid solubility of platinum in aluminum is vanishingly small (less than 0.01 weight percent at the eutectic temperature of 655.5° C). Thus, if a reasonable amount of platinum were added to the Al-Ni mixture prior to solidification, the platinum would be found to segregate to the second phase where it would substitute for some of the nickel in the fibers. After removal of the matrix and chemical leaching of the fibers the resultant skeletal fibers would be of a Ni-Pt solid solution alloy. As a general rule, in fabricating alloy catalysts of this type, one would look for greater solid solubilities between the desired catalysts alloy elements than the solid solubility of either element in the matrix.

This invention may be better understood by referring to the following illustrative examples.

EXAMPLE 1

A eutectic mixture of aluminum-nickel (93.8% Al, 6.2% Ni) was directionally solidified at a rate of 11 cm per hour. The solidified alloy was leached in an aqueous solution of 10% HCl until the matrix was completely dissolved. The acid solution was specific to the matrix and did not appreciably attack the $Al_3Ni$ intermetallic fiber. A transmission electron micrograph of one of the removed fiber is shown as FIG. 1. The fine size of the fiber is apparent, the fiber diameter is about 3,000 A. Also shown in FIG. 1 is an electron diffraction pattern showing the single crystal nature of the $Al_3Ni$ fiber with orthorhombic crystal structure. The orientation of the fiber crystal is that the [10] direction is parallel to the $Al_3Ni$ fiber axis.

EXAMPLE 2

Figure 2:
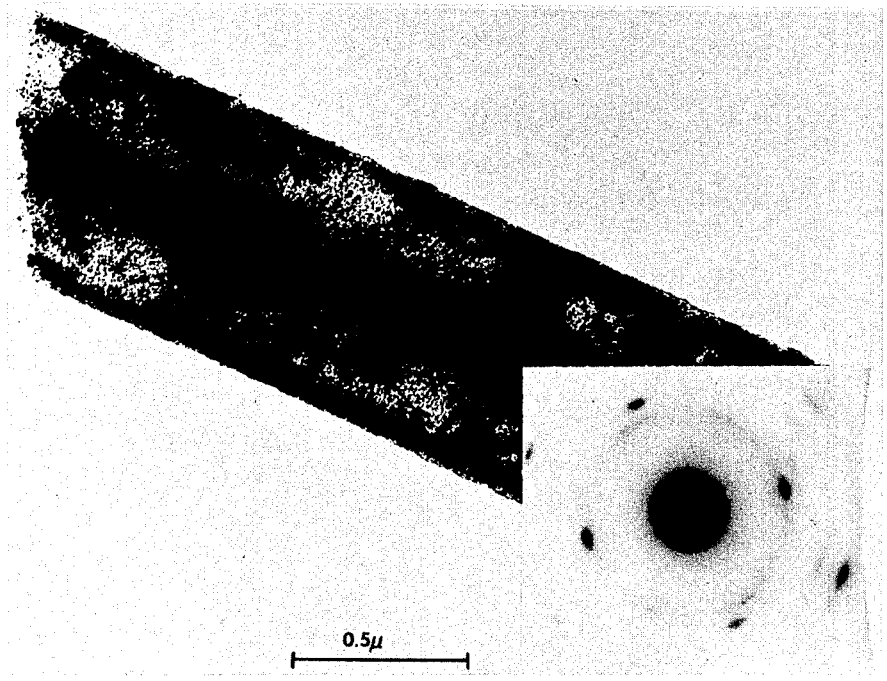
FIG. 2 shows a transmission electron micrograph of porous nickel single crystal fibers produced by chemically leaching extracted $Al_3Ni$ fibers.

The $Al_3Ni$ intermetallic fibers produced in Example 1 were leached in 4% NaOH to preferentially remove the aluminum. The result was porous, highly texture fibers. An electron micrograph of a leached fiber is shown as FIG. 2. The porous nature is apparent. The insert electron diffraction pattern shows that the porous single crystal is imperfect (textures), further, the orientation chemistry and structure of the crystal has changed, the long axis of the fiber is now parallel to the [110] direction of the new face centered cubic nickel fiber.

EXAMPLE 3

A eutectic mixture of the catalytically active metals platinum and rhodium with aluminum, consisting of 96.9 weight percent aluminun, 2.8% platinum, and 0.3% rhodium was cooled through its eutectic point at a solidification velocity of 10 cm/hour forming needles of the intermetallic compound $Al_4$ (Pt, Rh), the catalytically active portion of this phase consisted 90% Pt and 10% Rh fibers contained in an aluminum matrix. The (Pt, Rh) whiskers were removed by leaching in boiling 10% NaOH. These porous whiskers had an average diameter of 5,000 A and nitrogen B.E.T. surface area of 120 $m^2$/gm.

EXAMPLE 5

A eutectic mixture of the catalytically active metals platinum and nickel with aluminum, consisting of 95.9 weight percent aluminum, 2.05% platinum, and 2.05% nickel was cooled through its eutectic temperature at a solidification velocity of 10 cm/hour. The porous (Pt, Ni) whiskers were removed by leaching in a boiling 10% NaOH. These whiskers had an average diameter of 20,000 A and were strongly ferromagnetic. These ferromagnetic whiskers may be aligned in a magnetic field, permitting the fabrication of unique catalyst geometries.

EXAMPLE 6

A eutectic mixture of aluminum and palladium consisting of 77 weight percent Al and 23% Pd was directionally solidified at a velocity of 2 cm/hour. Porous palladium lamellae with a surface area of 73 $m^2$/gm were produced after leaching the samples of the aligned eutectic in boiling 10% NaOH.

EXAMPLE 7

A eutectic mixture of aluminum and gold consisting of 91 weight percent aluminum and 9% gold was directionally solidified at a velocity of 2 cm/hour. After leaching in boiling 10% NaOH porous gold sheets or platelets with average dimensions of 20,000 A thickness and 300,000 A length and width were obtained.

EXAMPLE 8

A monovariant eutectic mixture of aluminum, gold, and platinum consisting of 91 weight percent Al, 8.5% Au, and 0.5% Pt was cooled through its eutectic temperature with a solidification velocity of 1000 cm/hour. After leaching the $Al_2$ (Au, Pt) as described in boiling 10% NaOH porous (Au, Pt) whiskers with an average diameter of 1000 A and a surface area of 12 $m^2$/gm were obtained.

EXAMPLE 9

Figure 3:
FIG. 3 shows a transmission electron micrograph of porous nickel fibers produced from powdered aluminum-nickel.

A mass of molten aluminum-nickel composition as in Example 1 was converted to powder by a proprietary inert gas atomization process. The resultant powder ranged in size from +120 to −325 mesh. The powder was screened and divided into different particle size ranges. The finest grouping was −325 mesh. A sample of these powders was leached in a KOH solution to simultaneously remove both the matrix and the Al from the Al $_3$Ni fiber. A transmission electron micrograph is shown in FIG. 3. The fibers are porous and range in diameter from 300 A to 800 A.

TABLE 1

| Solidification Velocity (cm/Hr) | Average Diameter A | B.E.T. Surface Area (m²/gm) | Equivalent Solid Pt Rod Diameter A |
|---|---|---|---|
| 2 | 15,000 | 80 | 23.4 |
| 50 | 2,000 | 141 | 13.2 |
| 200 | 1,600 | 139 | 13.4 |
| 1000 | 800 | 118–127 | 17.1–15.6 |

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of our invention, that which we claim as new and desire to secure by Letters Patent of the United States is:

1. Active catalytic material which comprises a plurality of porous single crystal metallic fibers of high surface area comprising metals selected from the group consisting of the IB metals, the IVB metals, the VB metals, the VIB metals, the VIIB metals, and the VIII metals.

2. A process producing catalytically active porous single crystal metallic fibers of high surface area including the steps of
   a. providing a mass of material of eutectic composition which solidified has a microstructure which include a solid solution matrix containing a discrete intermetallic phase, said intermetallic phase being a compound between the predominant element of the matrix phase and a catalytically active metal, said predominant element of the matrix phase being less noble than the catalytically active element;
   b. solidifying the eutectic material to provide a plurality of single crystal intermetallic fibers surrounded by a continuous matrix;
   c. preferentially removing the matrix to leave a plurality of single crystal intermetallic fibers; and
   d. preferentially removing at least a portion of the less noble element from the fibers to produce a plurality of porous catalytically active single crystal metallic fibers.

3. A process as in claim 2 wherein steps c. and d. are performed concurrently.

4. A process as in claim 2 wherein the solidification process is a directional solidification whereby the resultant single crystal fibers are oriented within the matrix and are of constant diameter.

5. A process as in claim 2 wherein the solidification process is a liquid metal atomization process which produces metal powder containing single crystal intermetallic fibers.

6. Catalytic fibers as in claim 1 consisting essentially of a material chosen from the group consisting of Ni, Pt, Os, Pd, Ru, Re, Rh, Au, Ir, Co, Fe, Mo, Cu and Ag.

7. A process as in claim 2 wherein the predominant element of the matrix phase is selected from the group consisting of Al, Cu, Mg, Zn, and Si.

8. A process as in claim 2 wherein the predominant element of the matrix phase is aluminum.

9. A process as in claim 2 wherein the catalytic element which forms the intermetallic phase is selected from the group consisting of Ru, Rh, Co, Ni, Pt, Fe, and Mo.

* * * * *

UNITED STATES PATENT AND TRADEMARK OFFICE
CERTIFICATE OF CORRECTION

PATENT NO. : 4,069,171
DATED : January 17, 1978
INVENTOR(S) : Franklin D. Lemkey and Gerald S. Golden It is certified that error appears in the above-identified patent and that said Letters Patent are hereby corrected as shown below:

| | |
|---|---|
| Column 1, line 19 | "fabriccation" should read -- fabrication -- |
| Column 4, line 32 | "lach" should read -- leach -- |
| Column 5, line 59 | "[10]" should read -- [010] -- |

Signed and Sealed this

Fourth Day of July 1978

[SEAL]

Attest:

RUTH C. MASON
Attesting Officer

DONALD W. BANNER
Commissioner of Patents and Trademarks